US010985850B1

(12) United States Patent
Ichapurapu et al.

(10) Patent No.: US 10,985,850 B1
(45) Date of Patent: Apr. 20, 2021

(54) MEDIA DISTRIBUTION BETWEEN ELECTRONIC DEVICES FOR LOW-LATENCY APPLICATIONS

(71) Applicant: Amazon Technologies, Inc., Seattle, WA (US)

(72) Inventors: Ravi Ichapurapu, Morgan Hill, CA (US); Sameet Ramakrishnan, Saratoga, CA (US); Morris Yuanhsiang Hsu, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 20 days.

(21) Appl. No.: 16/218,211

(22) Filed: Dec. 12, 2018

(51) Int. Cl.
| | |
|---|---|
| H04H 20/18 | (2008.01) |
| H04W 56/00 | (2009.01) |
| H04W 4/80 | (2018.01) |
| G06F 3/16 | (2006.01) |
| H04H 20/22 | (2008.01) |
| H04H 20/71 | (2008.01) |
| G10L 15/22 | (2006.01) |

(Continued)

(52) U.S. Cl.
CPC ............. *H04H 20/18* (2013.01); *G06F 3/167* (2013.01); *G10L 15/22* (2013.01); *H04H 20/22* (2013.01); *H04H 20/71* (2013.01); *H04W 4/80* (2018.02); *H04W 56/001* (2013.01); *H04W 80/02* (2013.01); *H04W 84/12* (2013.01); *H04W 92/22* (2013.01)

(58) Field of Classification Search
CPC ......... G10L 25/60; G10L 25/21; G10L 25/84; G10L 17/005; G10L 15/30; G10L 15/22; G08B 1/08; G08B 21/02; H05B 37/0236; H05B 37/0272; H04W 4/80; H04W 48/18; H04W 36/30; H04W 24/02; H04W 72/0446; H04W 76/23; H04W 8/12; H04W 56/001; H04W 80/02; H04W 84/12; H04W 92/22; H04H 20/18; H04H 20/26; H04H 20/16; H04H 20/33
See application file for complete search history.

(56) References Cited

U.S. PATENT DOCUMENTS

| | | | |
|---|---|---|---|
| 8,755,738 B2 * | 6/2014 | Forutanpour | ........... H04L 67/18 455/3.01 |
| 9,100,772 B2 * | 8/2015 | Jantunen | ............... H04W 8/005 |

(Continued)

*Primary Examiner* — Hanh N Nguyen
(74) *Attorney, Agent, or Firm* — K&L Gates LLP

(57) ABSTRACT

A system includes a media distribution device including a first network interface, a second network interface, and a first processor. The first processor configures the first network interface to use a first communication network, and broadcasts, using the first communication network, audio data. The system includes a media device including a third network interface, a fourth network interface, and a second processor. The second processor causes, using the third network interface, the media device to join the first communication network, receives, using the third network interface, a first portion of the audio data, processes the first portion of the audio data to generate first audio output, and transmits, using the fourth network interface, a control signal to the second network interface of the media distribution device. The control signal is configured to cause the first processor to modify an attribute of the audio data or stop broadcasting the audio data.

19 Claims, 6 Drawing Sheets

(51) Int. Cl.
*H04W 92/22* (2009.01)
*H04W 84/12* (2009.01)
*H04W 80/02* (2009.01)

(56) References Cited

U.S. PATENT DOCUMENTS

| | | | | |
|---|---|---|---|---|
| 9,805,575 | B2* | 10/2017 | Sun | G10L 21/0208 |
| 10,250,345 | B2* | 4/2019 | Margolies | H04N 21/64707 |
| 10,608,692 | B1* | 3/2020 | Ramakrishnan | H04B 1/16 |
| 2012/0321112 | A1* | 12/2012 | Schubert | H04R 25/43 |
| | | | | 381/312 |
| 2013/0322424 | A1* | 12/2013 | Fraser | H04W 72/0446 |
| | | | | 370/343 |
| 2017/0134831 | A1* | 5/2017 | Talukder | H04N 21/8547 |
| 2018/0228006 | A1* | 8/2018 | Baker | H05B 47/105 |
| 2019/0341068 | A1* | 11/2019 | Shen | H04L 12/1827 |

\* cited by examiner

MEDIA DISTRIBUTION BETWEEN ELECTRONIC DEVICES FOR LOW-LATENCY APPLICATIONS

BACKGROUND

The present invention relates generally to the field of electronic devices and, more particularly, to approaches for media distribution between electronic devices for low-latency applications. In some applications, media, such as audio content, is transmitted or streamed to a number of electronic devices that, in turn, output audio signals corresponding to that audio content. Such an application generally requires low-latency transmissions of the audio content to the various electronic devices. If there is substantial delay in the delivery of the audio content to the electronic devices, the audio outputs of the various electronic devices may become unsynchronized in a manner noticeable to a listener. Similarly, if the electronic devices are used to output the audio portion of video or television content, excessive latency in delivering the audio content to the electronic devices may result in a noticeable audio delay that may be off-putting to a viewer.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
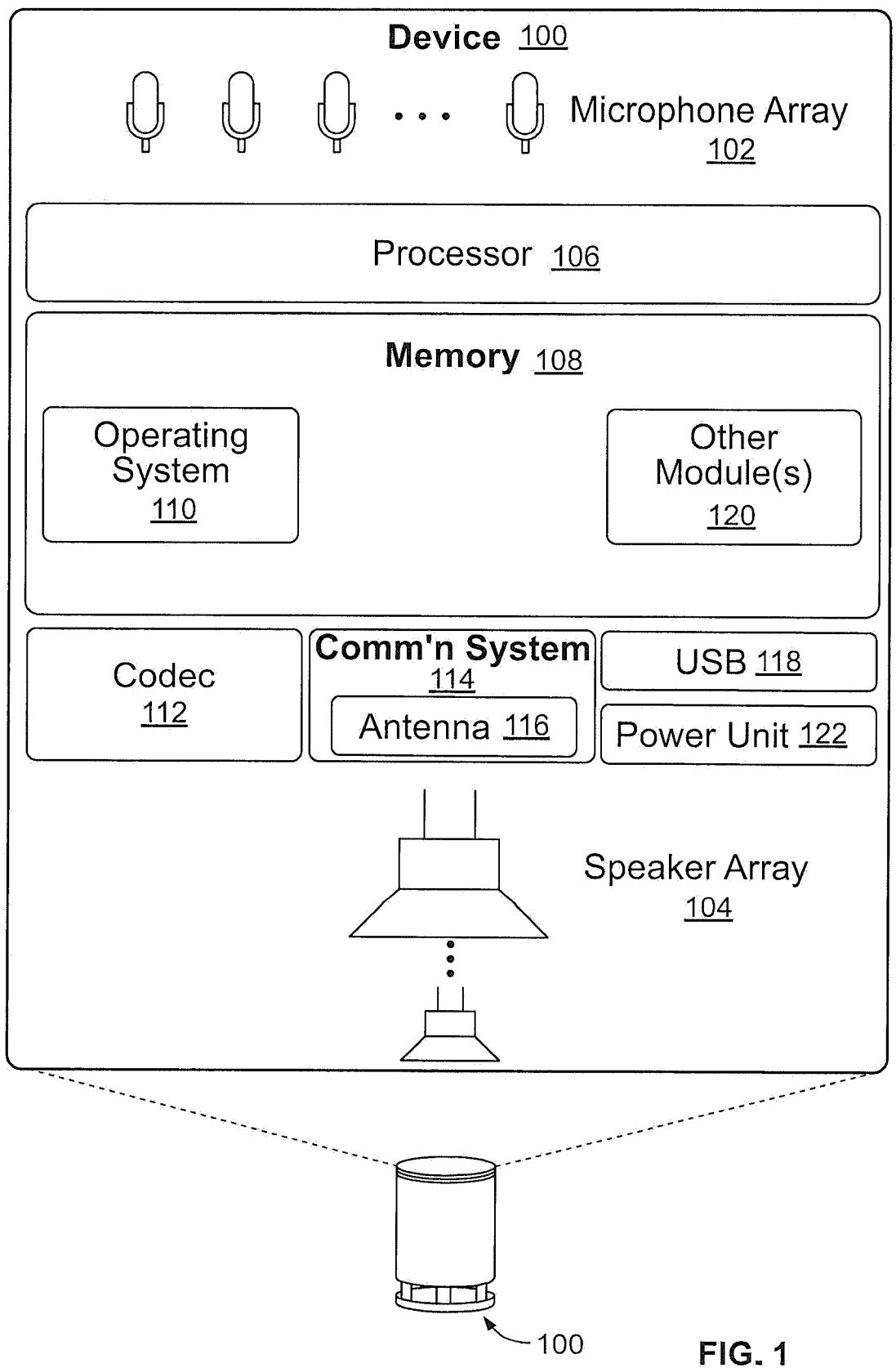
FIG. 1 shows selected functional components of an electronic device that may operate as a media device in accordance with the present disclosure.

Digital content, such as audio content or other multimedia, may be wirelessly transmitted to electronic devices using a suitable communications network. Those electronic devices can then process the received content and generate corresponding outputs, such as audio or visual output. In the case of audio content, the audio content may be standalone audio content (e.g., music, audio books, podcasts, and the like) or may be associated with video content (e.g., a soundtrack to a film or television program). Because the content can be transmitted wirelessly, the content may be transmitted to a number of electronic devices that are in different locations throughout a home or business. In the case of audio content that is associated with video content, the audio content may be transmitted to a number of electronic devices that then output sound and act as a set of surround-sound speakers to play back the audio content in conjunction with a display outputting the video content.

In these various wireless audio distribution applications, it is important to minimize or reduce the latency or delay in delivering the audio content to the various electronic devices. If there is substantial delay in the delivery of the audio content, the audio outputs of the various electronic devices may become unsynchronized in a manner noticeable to a listener. Similarly, if the electronic devices are used to play the audio portion of video or television content, excessive latency in delivering the audio content to the electronic devices may result in a noticeable audio delay in which the audio content lags the displayed video content in a manner that may be off-putting to a viewer.

Some audio-visual system specifications specify that any delay between video playback and audio output should not exceed 100 milliseconds (ms). For a typical user, delays less than 100 ms are not noticeable to the user, while delays that exceeds 100 ms can be noticed by some users. Typical processing time by an electronic device for audio content (i.e., translating the received digital audio content into an analog output signal to be applied to the device's speaker or speakers) is approximately 64 ms. In such an application, when limiting the delay to less than 100 ms, 34 ms remains in the allowable delay for wireless distribution of the audio content to the electronic devices. Accordingly, wireless audio content distribution requires low-latency transmission in order to satisfy performance goals of providing audio playback with undetectable or minimal delay.

In the present system a centralized electronic device, referred to as a master device or a media distribution device is configured to receive audio content from a source. The source may be a television that is connected to the master device and is configured to output an audio signal to the master device. In some cases, the source may be a streaming media player (SMP) device that is configured to retrieve multimedia content from a remote data store, process that multimedia content to generate an audio data stream and transmit the audio data stream to the master device while simultaneously transmitting a corresponding video data stream to a television. In still other cases, the master device itself may be configured to retrieve audio content from a remote source directly, such as by implementing a streaming media player functionality.

The master device is then configured to distribute the audio content, typically in the form of a digital data stream containing a sequence of frames of audio content encoded in a number of audio packets to a number of other electronic devices, referred to as media devices. The media devices receive the audio content wirelessly and generate a corresponding audio output via a speaker or array of speakers. To minimize latency in distributing the audio content, the media devices may be connected to the master device through a private wireless network to which only the master device and media devices belong. This can prevent interference or congestion due to the operations of other electronic devices (e.g. laptops, printers, and the like) that may be connected to a wireless network and communicating wirelessly in the same area as the master device and media devices.

In some cases, the private network may be configured as a fifth generation (5G) network enabling the master device to transmit audio content to the media devices with minimal interference. When the private network is initially configured and the connections between the master device and the various media devices are setup, the master device may perform an analysis of existing network conditions to select a channel for the private network having minimal traffic or noise.

When the private network is configured, the master device can begin streaming audio content to the connected media devices. To begin streaming audio content, the master device first determines whether the audio content will be transmitted to the connected media devices using buffering. To make this determination, the master device first determines whether the audio content is associated with corresponding video content. If not, the audio content is standalone audio content and buffering may be employed. If the audio content is associated with corresponding video content, the master device determines whether there is any delay in the playback of the video content. In some cases, video content will be rendered by a display device without any delay. For example, if a television is displaying video content received from directly from a source such as antenna, cable box, or satellite box, the video content may be displayed on the television without any delay (e.g., as soon as the video content becomes available). In that case, the audio content must be delivered to and outputted by the media devices as quickly as possible. As such, the master device implements a method for transmitting or streaming the audio content to the media devices without employing buffering and with minimal network overhead. Such an approach calls for the media devices to not take the time to transmit acknowledgements of received audio content packets. Instead, the media devices process packets of audio content as they are received from the master device. In this configuration, because buffering is not used and audio content retransmissions may be minimized, there may be a likelihood that the media devices do not receive all frames of audio content (or only partial frames).

If a media device only receives a portion a frame of audio content being transmitted by the master device, the media device begins processing the received audio content as the content becomes available. In some cases, the media devices may be configured to implement packet loss concealment to compensate for time periods during which the media device was unable to receive audio content from the master device. Such packet loss concealment may involve the media devices performing waveform substitution to generate output audio configured to mask or conceal time periods of missing or unavailable audio content.

In other cases, a content source may implement a video output delay so that the content source provides the audio content to the master device a short time period before the corresponding video content is displayed or rendered. That short time delay before the video content is displayed provides more time for the audio content to be distributed to and processed by the media devices. In that case, the master device may inform the media devices of the time delay enabling the media devices to implement a buffered approach in which audio content received from the master device is placed into a buffer before being processed to generate a corresponding audio output. In that case, the master device may be configured to transmit both the current audio content to be outputted by the media devices as well as advanced audio content that may be buffered by the media devices. This enables the media devices to buffer the advanced audio content. After the delay has expired, the media devices can retrieve the audio content from the buffer and generate an appropriate audio output that is in sequence with the delayed video output. In this arrangement, because the current audio content to be processed is also transmitted by the master device, any media devices that failed to receive the advanced audio content may still receive and output the current audio content. This buffered approach can provide more robustness to the audio content transmissions from the master device and enable media devices to more effectively synchronize audio output with corresponding video output.

In addition to being configured to output audio content, the media devices may include microphones or other input devices configured to receive voice or other input from a user. Voice input may be in the form of a voice command or voice content that is part of a teleconference or telephony activity. When a media device detects a voice input, the media device may transmit the voice input to the master device using the private network. In other embodiments, to avoid network congestion, the media devices may transmit the voice input to the master device using a separate network from the private network.

The master device is configured to simultaneously form network connections with the media devices through the private network and an access point that is part of a conventional wireless local area network (WLAN). After receiving the voice input from a media device, the master device accesses the conventional WLAN network in order to transmit the voice input to a suitable remote device configured to process the voice input. In an example, the master device may transmit the voice input through the WLAN to a remote cloud service for processing.

In some configurations, the master device may communicate directly with the media devices through the private network so that the master device forms a direct connection with each media device to which the master device is streaming audio content. In other configurations, the media devices may be arranged in different groupings. The media devices may be grouped based on location (e.g., a collection of media devices located in the same room may be grouped together, while a number of media devices located in another location (e.g., outside or in a bedroom) may be in a separate group). This grouping enables the master device to transmit different audio content to each group of media devices so that different media devices in different groups may output different audio. Within each group, one of the member media devices may be designated a primary media device. In that case, the master device may transmit the audio content for a particular group of media devices to that group's primary media device. The primary media device is then responsible for retransmitting the received audio content to the other members of the same group.

FIG. 1 shows selected functional components of an electronic device 100 that may operate as a media device in accordance with the present disclosure. Generally, device 100 may be implemented as a standalone device that is relatively simple in terms of functional capabilities with limited input/output components, memory and processing capabilities. For instance, device 100 may not have a keyboard, keypad, or other form of mechanical input. Nor does device 100 necessarily require a display or touch screen to facilitate visual presentation and user touch input. Instead, device 100 may be implemented with a network interface (wireless or wire-based), power, limited processing/memory capabilities, and, in some cases, the ability to both receive and output audio. In the illustrated implementation, device 100 includes an optional microphone array 102, speaker array 104 (i.e., one or more loudspeakers), processor 106, and memory 108.

Memory 108 may include computer-readable storage media ("CRSM"), which may be any available physical media accessible by the processor 106 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by processor 106.

Several modules such as instructions, data stores, and so forth may be stored within the memory 108 and configured to execute on processor 106. An operating system module 110 is configured to manage hardware and services (e.g., wireless unit, USB, Codec) within and coupled to device 100 for the benefit of other modules. Several other modules may be provided to process input from the user. For instance, a speech recognition module, if provided, enables some level of speech recognition functionality. In that case, an acoustic echo cancellation module and a double talk reduction module can be provided to process the audio signals to substantially cancel acoustic echoes and substantially reduce double talk that may occur. These modules may work together to identify times where echoes are present, where double talk is likely, where background noise is present, and attempt to reduce these external factors to isolate and focus on the near talker. A query formation module may also be provided to receive parsed speech content output by the speech recognition module and to form a search query or some form of request. This query formation module may utilize natural language processing (NLP) tools as well as various language modules to enable accurate construction of queries based on the user's speech input.

In embodiments, device 100 might further include a codec 112 coupled to the microphones of the microphone array 102 and the speakers of the speaker array 104 to encode and/or decode the audio signals. The codec 112 may convert audio data between analog and digital formats.

Device 100 includes a wireless communication system 114 coupled to an antenna 116 (which may include one or more separate antenna components) to facilitate a wireless connection to a network or one or more other remote components configured to communication with device 100. Wireless communication system 114 may implement one or more of various wireless technologies, such as WLAN, BLUETOOTH, ZIGBEE, and so on.

USB port 118 may further be provided as part of device 100 to facilitate a wired connection to a network, or a plug-in network device that communicates with other wireless networks. In addition to USB port 118, or as an alternative thereto, other forms of wired connections may be employed, such as a broadband connection, and connected to device 100 using one or more additional modules 120 that may be utilized for data transfer. A power unit 122 is further provided to distribute power to the various components of device 100.

In an exemplary environment device 100 may be positioned in any number of locations (e.g., ceiling, wall, in a lamp, beneath a table, on a work desk, in a hall, under a chair, etc.) within the environment. Device 100 is configured to communicatively couple to a number of remote entities over a network using communication system 114. Specifically, communication system 114 may receive audio content from a remote electronic device that is processed by processor 106 to generate a suitable audio output at speaker array 104. Device 100 may also communicate with various remote computer systems (not shown) that can interact with device 100. In some embodiments, the remote computer systems may comprise cloud services hosted, for example, on one or more servers. Such servers may be arranged in any number of ways, such as server farms, stacks, and the like that are commonly used in data centers.

Cloud services generally refer to a network-accessible platform implemented as a computing infrastructure of processors, storage, software, data access, and so forth that is maintained and accessible via a network such as the Internet. Cloud services do not require end-user knowledge of the physical location and configuration of the system that delivers the services. Common expressions associated with cloud services include "on-demand computing", "software as a service (SaaS)", "platform computing", "network accessible platform", and so forth.

Such cloud services may host any number of applications that can process input received from device 100, and produce a suitable response. Example applications might include web browsing, online shopping, banking, email, work tools, productivity, entertainment, educational, and so forth.

In an embodiment, inputs provided to the cloud services may be in the form of voice commands captured via microphone array 102. Microphone array 102 is generally arranged at a first or top end of device 100. Microphone array 102 may include multiple microphones, but in some implementations device 100 may be embodied with only one microphone.

Speaker array 104 may be configured to emit sounds at various frequency ranges, so that each speaker of speaker array 104 has a different range. In this manner, device 100 may output high frequency signals, mid frequency signals, and low frequency signals. Device 100 may further include computing components that process inputs received by device 100 (e.g., via microphone array 102), enable communication with the remote entities via communication system 114, and generate audio to be output by speaker array 104.

Figure 2:
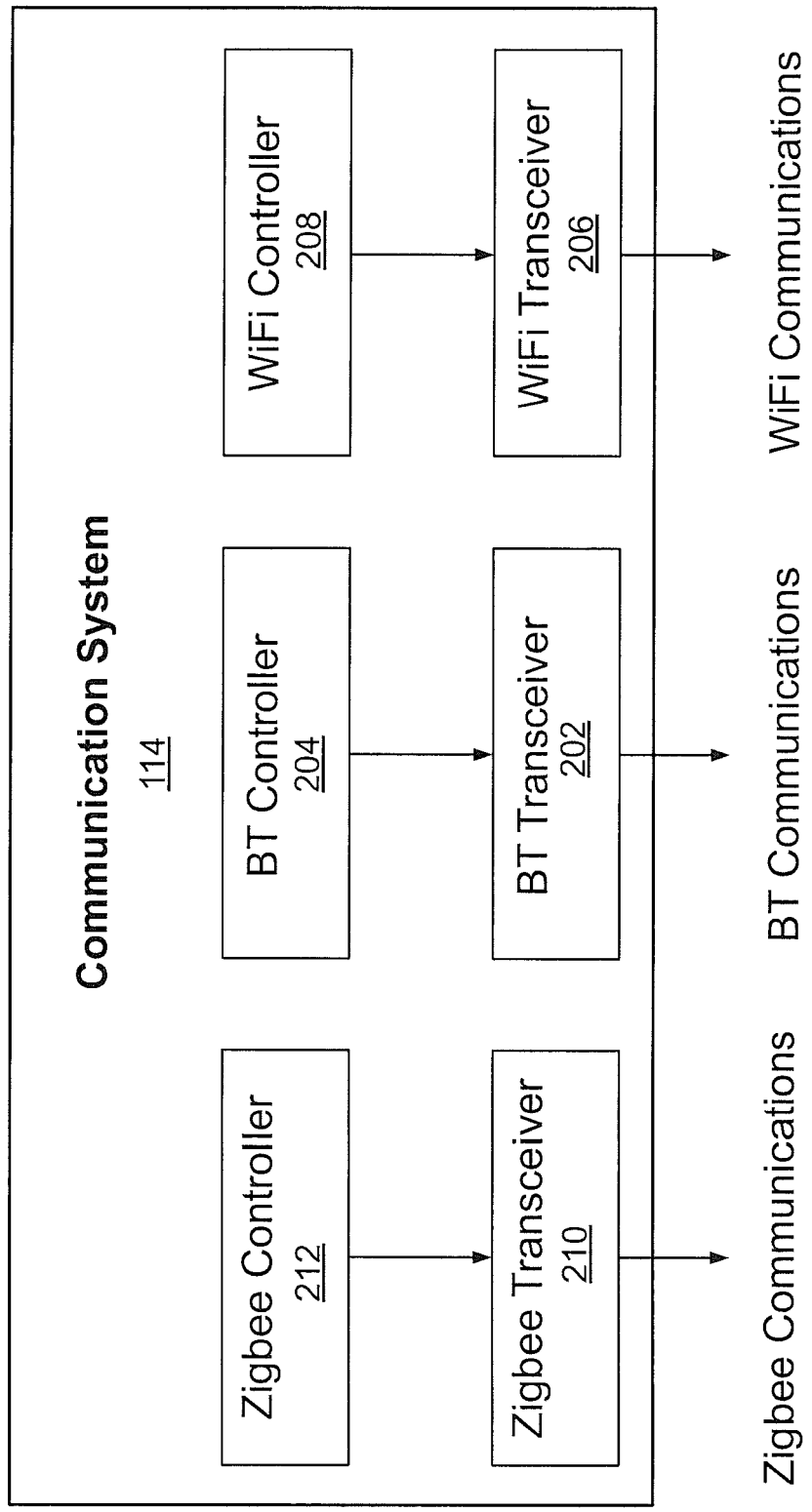
FIG. 2 is a block diagram depicting functional components of a communication system of an example media device.

FIG. 2 is a block diagram depicting functional components of communication system 114 of an example electronic device (e.g., device 100 of FIG. 1). In this example, communication system 114 includes network interfaces for transmitting, receiving, encoding and decoding BLUETOOTH, wireless local area network (WLAN) and ZIGBEE communications. The network interfaces each include a transceiver configured to process messages for transmission via a corresponding antenna and decode messages received from the antenna and a controller configured to control the operations of the transceiver. Although a specific combination of network interfaces is illustrated in FIG. 2, it should be understood that a device 100 may include different combinations of network interfaces. For example, a device 100 may include multiple of the same type of network interfaces (e.g., multiple separate WIFI or WLAN network interfaces (including corresponding controllers and transceivers) as well as fewer than or more than three network interfaces. Separate network interfaces, even if of the same type, can execute concurrent wireless communications, such as using different communication channels, enabling the simultaneously reception of different messages or transmissions. Specifically, communication system 114 includes BLUETOOTH transceiver 202 that is configured to provide BLUETOOTH communication capability by transmitting BLUETOOTH packets using a suitable antenna (not shown) and receiving BLUETOOTH packets via the same antenna. BLUETOOTH controller 204 is coupled to the BLUETOOTH transceiver 202. BLUETOOTH controller 204 is configured to encode and decode BLUETOOTH communications that are either transmitted through BLUETOOTH transceiver 202 or received via BLUETOOTH transceiver 202. BLUETOOTH controller 204 is further configured to select an appropriate BLUETOOTH channel for the transmission or reception of a BLUETOOTH data packet and is configured to instruct BLUETOOTH transceiver 202 to utilize such BLUETOOTH channel when either transmitting or receiving packets. In some cases, as described herein, the selection of an appropriate channel for data transmission or reception may involve BLUETOOTH controller 204 executing one or more algorithms or routines to identify an appropriate channel.

During operation of the BLUETOOTH communication system, BLUETOOTH controller 204 may further monitor or control one or more attributes of data packets being transmitted or received via BLUETOOTH transceiver 202. For example, for data packets transmitted using a particular BLUETOOTH channel, BLUETOOTH controller 204 can set a duty cycle to be utilized when transmitting the data packet. Conversely, for data packets received by BLUETOOTH transceiver 202 in a particular channel, BLUETOOTH controller 204 can determine a received signal strength indicator (RSSI) for those communications. The RSSI is a measurement of the power of the received signal compared to background noise, which can be an indicator of how much interference is present on that particular channel.

Communication system 114 includes WLAN transceiver 206 that is configured to provide WLAN communication capability by transmitting WLAN packets using a suitable antenna (not shown) and receiving WLAN packets using the same antenna. WLAN controller 208 is coupled to the WLAN transceiver 206. WLAN controller 208 is configured to encode and decode WLAN communications that are either transmitted through WLAN transceiver 206 or received using WLAN transceiver 206. WLAN controller 208 is further configured to select an appropriate WLAN channel for the transmission or reception of WLAN data packets and is configured to instruct WLAN transceiver 206 to utilize such WLAN channel when either transmitting or receiving packets. In some cases, as described herein, the selection of an appropriate channel for data transmission or reception may involve WLAN controller 208 executing one or more algorithms or routines to identify an appropriate channel.

During operation of the WLAN communication system, WLAN controller 208 may further monitor or control one or more attributes of data packets being transmitted or received via WLAN transceiver 206. For example, for data packets transmitted using a particular WLAN channel, WLAN controller 208 can set a duty cycle to be utilized when transmitted the data packet. Conversely, for data packets received by WLAN transceiver 206 in a particular channel, WLAN controller 208 can determine an RSSI for those communications, which can be an indicator of how much interference or noise is present on that particular channel.

Communication system 114 includes ZIGBEE transceiver 210 that is configured to provide ZIGBEE communications by transmitting ZIGBEE packets using a suitable antenna (not shown) and receiving ZIGBEE packets via the same antenna. ZIGBEE controller 212 is coupled to the ZIGBEE transceiver 210. ZIGBEE controller 212 is configured to encode and decode ZIGBEE communications that are either transmitted through ZIGBEE transceiver 210 or received via ZIGBEE transceiver 210. ZIGBEE controller 212 is further configured to select an appropriate ZIGBEE channel for the transmission or reception of a ZIGBEE data packet and is configured to instruct ZIGBEE transceiver 210 to utilize such ZIGBEE channel when either transmitting or receiving packets. In some cases, as described herein, the selection of an appropriate channel for data transmission or reception may involve ZIGBEE controller 212 executing one or more algorithms or routines to identify an appropriate channel.

During operation of the ZIGBEE communication system, ZIGBEE controller 212 may further monitor or control one or more attributes of data packets being transmitted or received via ZIGBEE transceiver 210. For example, for data packets transmitted using a particular ZIGBEE channel, ZIGBEE controller 212 can set a duty cycle to be utilized when transmitted the data packet. Conversely, for data packets received by ZIGBEE transceiver 210 in a particular channel, ZIGBEE controller 212 can determine an RSSI for those communications, which can be an indicator of how much interference or noise is present on that particular channel.

In a multimedia content distribution application, a number of electronic devices such as device 100, may be arranged in an environment to receive content from a multimedia source and generate audio output in response to that multimedia content. In that manner, a number of different electronic devices may be arranged or positioned throughout the environment to act as a multi-speaker system. If the audio content is associated with video output from a suitable display system, the various electronic devices may operate as a surround-sound system for the video content.

Figure 3:
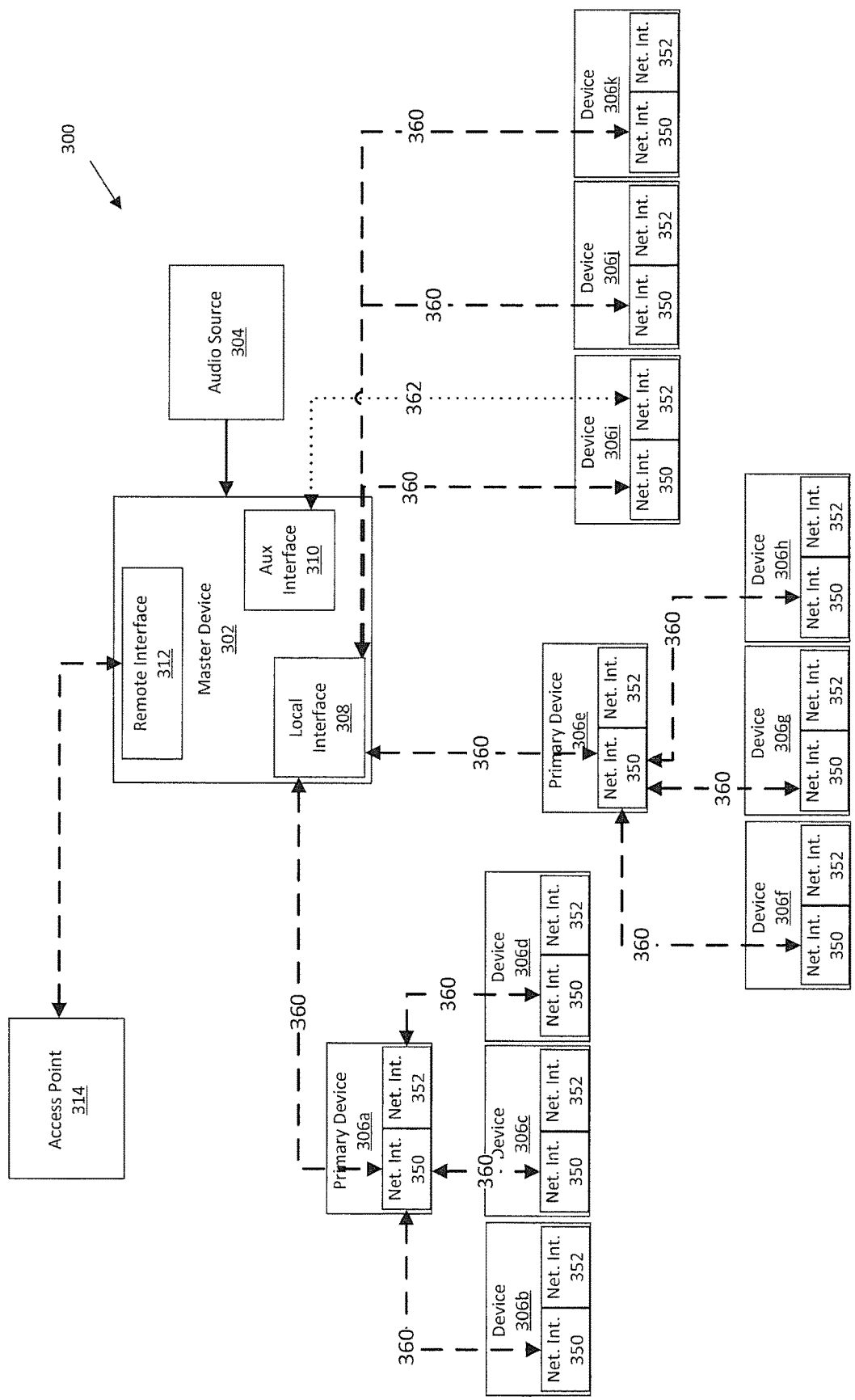
FIG. 3 is a block diagram illustrating an arrangement of electronic devices in which the electronic devices serve as media devices to output audio content received from a multimedia content source.

FIG. 3 is a block diagram illustrating a typical arrangement of electronic devices in which the electronic devices serve as media devices to output audio content received from an audio content source. Environment 300 includes master device 302 (also referred to as a media distribution device). Master device 302 includes an audio input interface operated by a processor to receive audio content for an audio source 304. The audio content may be encoded using any suitable encoding scheme. Audio source 304 may be a television or other display configured to output an audio data stream (e.g., an analog audio stream or a digital audio stream encoded using linear pulse-code modulation (LPCM) as part of a High-Definition Multimedia Interface (HDMI) connection). Audio source 304 may be a music player (e.g., digital audio player, compact disc player, or the like) configured to output an analog audio data stream. Audio source 304 may also be a device, such as a streaming media player configured to retrieve multimedia content from a remote data store, process that multimedia content to generate an audio data stream and transmit the audio data stream to master device 302 while simultaneously transmitting a corresponding video data stream to a television. In still other cases, master device 302 itself may be configured to retrieve audio content from a remote source directly, such as by implementing a streaming media player functionality. In such a configuration, audio source 304 may be implemented within master device 302 or as part of master device 302. Although the example environment 300 of FIG. 3 is directed to a system for distributing audio content, it should be understood that the depicted environment may instead be utilized to distribute video or other multimedia content to a number of electronic devices that are each configured to receive and process that content to generate a corresponding output or rendering.

Having received the audio content, master device 302 is configured to distribute the audio content (or at least a portion of the audio content) to a number of media devices 306a-306k, collectively 306. Media devices 306 may be configured in a somewhat similar manner to electronic device 100, described above, though the various media devices 306 may have different features and capacities, form factors, processing power, speaker and/or microphone combinations, and the like. As such, each media device 306 may include a communication system (e.g., communication system 114) configured to receive the audio content from master device 302, a processor (e.g., processor 106) configured to process the received audio content into an analog audio signal, and a speaker or speaker array (e.g., speaker array 104) to generate an audible output based on the analog audio signal. As described herein, the communication system of each media device 306 may include multiple network interfaces (e.g., network interfaces 350 and 352, which may include multiple WLAN radio controller or combinations of WLAN and BLUETOOTH network interfaces) for communicating with master device 302 and/or remote computer systems. To the extent the media devices 306 include microphones, the media devices 306 may be referred to as a voice-controlled media devices 306.

To transmit the audio content to each of media devices 306, master device 302 includes a local network interface 308. Local network interface 308 is configured to implement one or more wireless networking protocols to wireless transmit the audio content to the communication systems of media devices 306.

Local network interface 308 may be configured to implement various wireless networking protocols, such as ZIGBEE, WLAN, and BLUETOOTH protocols. In an embodiment, master device 302 is configured to create a private communication network (indicated on FIG. 3 by arrows 360) and then configure local network interface 308 to join the private network. The private network may be configured so that only local network interface 308 and a first network interface 350 of media devices 306 connect. The private network may be a fifth generation (5G) network enabling the master device 302 to transmit audio content to the media devices 306 with minimal interference.

When the private network is initially configured and the connections between master device 302 and media devices 306 are setup, master device 302 may perform an analysis of existing network conditions to select a channel for the private network having minimal traffic or noise. For example, when setting up the private network as a 5G network, master device 302 may be configured to scan all available 5G channels to identify the channel having the lowest airtime utilization (e.g., the lowest amount of ambient traffic). Master device 302 may also ping one or more media devices 306 using the available 5G channels to determine ping latency times for each channel. Ping latency refers to a measurement of the roundtrip time for a message to be transmitted to a device and a response to that message being received from the same device. In this example, the ping latency measures the round-trip time required for a message to be transmitted from the master device 302 to one of the media devices 306 and the media device 306 to transmit a corresponding response that is received at the master device 302.

The processor of master device 302 can then identify a channel having a lowest airtime utilization (i.e., the lowest amount of wireless traffic occurring at frequencies encompassed by the channel) and a ping latency that falls below a threshold ping value for adequate communications. For example, master device 302 may select between channels at different frequencies (e.g., a channel at 80 megahertz versus another channel at 20 megahertz). Furthermore, based upon the traffic conditions of the selected channel, the master device 302 may select an optimal or appropriate multicast rate for the channel. The private network can then be setup using the identified channel and media device 306 can connect to the private network on that channel to begin receiving content transmissions from master device 302 at the selected multicast rate.

In some embodiments, different multicast rates may be utilized for different retransmissions of a particular frame of audio content. For example, when transmitting a frame for the first time, a relatively high multicast rate may be utilized. But for subsequent retransmissions, the multicast rate could be gradually reduced for each retransmission. Slower multicast rates used for later retransmissions may provide an increased likelihood that the retransmission is successfully received by a target media device 306.

In some cases, when pinging each of media devices 306 to determine ping latency, master device 302 may determine that only a subset of media devices 306 have high ping latency. For example, if 10 media devices 306 are present, the ping latency to only two of those media devices 306 may exceed a predetermined threshold. For the media devices 306 associated with high latency, master device 302 may generate an output (e.g., by transmitting a message to a computing device of the user or generating an audible output at master device 302 and/or the media devices 306 having high ping latency) that the user should consider moving those media devices 306, potentially by moving them closer to master device 302 in an attempt to reduce their ping latency. Alternatively, the master device 302 may generate an output recommending that the user remove the one or more media devices 306 having high ping latency from the system (e.g., by powering down the media devices 306 or causing them to disconnect from the private network).

Over time, channel quality may deteriorate. As such, master device 302 may be configured to periodically ping one or more of media devices 306 to determine a ping latency for the current channel. If the channel quality has deteriorated, ping latency may exceed the threshold identified above. If so, master device 302 may determine that channel quality has deteriorated and may initiate the scan of channel airtime utilization and ping latency to media devices 306 to identify another channel with adequate channel conditions. Once identified, the private network may be configured by master device 302 to use the identified channel and the processor of master device 302 will instruct media devices 306 to join the newly-configured private network.

When the private network is established, media devices 306 cause a first network interface 350 of each media device 306 to connect to the private network (as indicated by arrows 360). If the private network is a 5 GHz or 2.4 GHz WIFI network, for example, this may involve the media devices 306 configuring WLAN network interfaces (e.g., the combination of WIFI controller 208 and WIFI transceiver 206) to join the private network as setup by master device 302 in order to communication with master device 302.

With first network interfaces 350 of media devices 306 connected to the private network, master device 302 utilizes a time synchronization protocol (e.g., in accordance with 801.11$mc$) to synchronize clocks on each of media devices 306, which may assist in the media devices 306 accurately synchronizing audio outputs. Time synchronization may be performed using hardware timestamping as opposed to other time synchronization methods that may require more network overhead. Time synchronization generally involves master device 302 transmitting a clock synchronization message or sequence of clock synchronization messages to each of the media devices 306 connected to the private network to enable the media devices 306 and master device 302 to synchronize clocks or timers running on master device 302 and media devices 306.

Using local network interface 308 and the private network, master device 302 transmits the audio content to first network interfaces 350 of media devices 306. Depending upon the application, master device 302 may transmit the same audio content to all media device 306. In some cases, different audio content may be transmitted to different media devices 306. For example, different music or soundtrack audio content could be transmitted to different media devices 306 (e.g., media devices 306 in different locations). In some cases, different channels (e.g., right, left, center, and surround channels) of audio content may be transmitted to different media devices 306, enabling those media devices 306 to operate as a surround-sound system for a television, for example.

In some cases, master device 302 may transmit the audio content from local interface 308 directly to first network interfaces 350 of one or more media devices 306. In FIG. 3, for example, master device 302 is directly connected to media devices 306i, 306j, and 306k through the private network and may transmit audio content directly to first network interfaces 350 of media devices 306i, 306j, and 306k without the audio content passing through any intermediary devices.

When distributing the audio content, master device 302 may broadcast the audio data through the private network using a multicast real-time transport protocol for packet transfer in which packets containing the contents of the audio content are broadcast multiple times to the media devices 306. Such an approach may ensure that if a particular media device 306 does not successfully receive the first broadcast of a packet of audio content, the media device 306 may successfully receive a subsequent retransmissions of the packet containing the same audio content frame. This approach, however, may result in many duplicate packets being received by a particular media device 306. Although the media device 306 may be configured to filter duplicate packets at the application layer (e.g., by inspecting the contents of each packet and determining that the packets are duplicated), in some embodiments, a hardware layer of the media device's 306 network stack may be configured to filter duplicate packets before the duplicate packets are passed up through the stack to the application layer of the media device 306.

Media devices 306 may be formed into groups. In FIG. 3, media devices 306a, 306b, 306c, and 306d belong to a first group and media devices 306e, 306f, 306g, and 306h belong to a second group. Typically media devices 306 will be grouped based upon their location. In the example of FIG. 3, media devices 306 in the first group may all be located in the same room (e.g., a living room of a house) and the media devices 306 in the second group may be grouped in a different location (e.g., a patio of the same house).

When media devices 306 are placed into groups, as depicted in FIG. 3, one of the media devices 306 in each group may be designated a primary media device 306. Primary devices 306 may be designated by first determining the connection quality between master device 302 and each media device 306 in a particular group. The connection quality may be indicated by the ping latency to each device 306. The device 306 within the group having the best connection (e.g., the lowest ping latency) may be designated the primary media device 306. Master device 302 can then communicate directly with the designated primary media devices 306. The primary media devices 306 then, in turn, will communicate the received audio content to the other media devices 306 in the same group. For example, with reference to FIG. 3, master device 302 may transmit audio content to primary media device 306a using the private network. Upon receipt of the audio content, primary device 306a then retransmits the audio content to the other media devices 306b, 306c, and 306d in the same group. When the audio content has been distributed to media devices 306b, 306c, and 306d, all media devices 306a, 306b, 306c, and 306d can process the audio content to generate an appropriate audio output.

Because media devices 306 may be configured in accordance with electronic device 100, described above, one or more of media devices 306 may include a microphone (e.g., microphone array 102) configured to detect voice signals comprising instructions generated by a user in proximity to the media device 306. Typically, such voice instructions (or other user inputs), once captured, are processed and analyzed by a remote computer system, such as the cloud. To process voice communications captured by the microphone of a media device 306, the media device 306 first converts the captured analog signal of the voice instruction into voice or speech data representing the recorded voice input. The voice or speech data is in the form of a digital data stream (such a conversion may be performed by codec 112, for example). The digital data stream representing the voice or speech recording is then transmitted to the remote system for processing. In an embodiment, this involves the media device 306 first transmitting the data stream to master device 302.

Media device 306 may transmit the encoded voice data to local master device 302 using first network interface 350 via the private network described above. In other embodiments, however, to avoid adding traffic and potentially causing congestion of the private network, the media device 306 may transmit the voice data stream to master device 302 using an alternative communication network. As an example, master device 302 includes auxiliary network interface 310. In embodiments, auxiliary network interface 310 may be a BLUETOOTH low energy (BLE) interface or a WLAN network interface. Auxiliary network interface 310 operates independently from local interface 308. When transmitting the voice data, the media device 306 may utilize its own second network interface 352 (e.g., a BLE network interface (such as BLUETOOTH controller 204 and BLUETOOTH transceiver 202) or a WLAN network interface) to transmit the voice data to auxiliary network interface 310. As such, the media device 306 can use a separate communication network (i.e., separate network interfaces) to transmit the voice data to master device 302 and avoid using the network interface that is connected to the private network used for transmitting the audio content. This approach can further reduce congestion on the private network. In some embodiments, first network interface 350 of media devices 306 may be configured to connect to the private network where the private network is implemented using a particular WLAN communication channel. Simultaneously, second network interface 352 of media devices 306 may be configured to communicate with master device 302 using a different WLAN communication channel, thereby reducing interference with communications occurring on the private network.

Master device 302 includes a remote network interface (e.g., a WLAN interface) enabling master device 302 to communicate with a remote computer system via network access point 314. Accordingly, after receiving the voice data via auxiliary network interface 310, master device 302 can use remote interface 312 to transmit the encoded voice data to a remote computer system via access point 314 for processing. For example, master device 302 may transmit the encoded voice data to a cloud computing system configured to analyze the voice data and generate an appropriate output. The output may be configured to cause the media device 306 that originally received the voice instruction to generate an audio output (e.g., to output an answer to a question) or to undertake a particular action (e.g., to begin playing a particular audio content). Upon receiving the response from the remote computer system, master device 302 may transmit the response to the media device 306 that originally transmitted the voice instructions via private network or using an alternative network interface. If the response from the remote computer system is configured to generate an audio response, master device 302 may be configured to transmit the response through the private network to all media devices 306 connected to the private network. In that case, the response may generate simultaneous audio output at all connected media devices 306. Alternatively, the response may be transmitted through the private network to the first network interface 350 of the media device 306 that originally generated the voice data. Finally, the response may be transmitted by master device 302 without using the private network (and therefore minimizing traffic and congestion on the private network). In that case, the response may be transmitted from the auxiliary network interface 310 of master device 302 to the second network interface 352 of the media device 306 that originally generated the voice data and transmitted the voice data to master device 302.

Although in the example depicted in FIG. 3 auxiliary network interface 310 is described as a BLE interface, it should be understood that master device 302 may include alternative network interfaces enabling media devices 306 to transmit encoded voice data to master device 302 without using the private network.

In still other embodiments, second network interfaces 352 of media devices 306 may be utilized to transmit other messages or data back to master device 302 (and, specifically, to auxiliary network interface 310 of master device 302). For example, media devices 306 may be configured to use second network interfaces 352 to transmit acknowledgements (ACK messages) of received audio content back to master device 302. The acknowledge messages may identify which specific frames of audio content have been successfully received by a media device 306. Such an approach avoids adding network congestion to the private network while using the alternative network interface to inform master device 302 when particular audio content packets have been successfully received. Such acknowledgements may prevent master device 302 from retransmitting audio content packets that have already been successfully received by all media devices 306. In some cases, the media devices 306 may further use the alternate interface (e.g., second network interface 352) to specifically request retransmissions of particular data packets or frames. This may occur if the master device 302 has ceased transmissions or retransmissions of particular frame before a media device 306 was able to successfully receive the frame. In FIG. 3, arrow 362 depicts a connection between second network interface 352 of media device 306i and auxiliary interface 310 enabling acknowledgement messages to be transmitted from media device 306i to master device 302.

Second network interfaces 352 of media devices 306 may also be utilized to transmit control signals or messages or data back to master device 302 (and, specifically, to auxiliary network interface 310 of master device 302). The control signals may be configured to control or modify an attribute of the audio content being distributed by master device 302 through the private network. For example, the control signals may cause master device 302 to pause the transmission of the audio content, effectively pausing the output. Similarly, the control signals may cause master device 302 to resume broadcasting paused audio content using the private network. The control signals may also cause master device 302 to modify a volume of the audio content being distributed to the media devices 306 or to select a specific audio content to be broadcast (e.g., by instructing the master device 302 to request a particular audio stream from audio source 304).

Similarly, second network interfaces 352 of media devices 306 may be utilized to receive clock synchronization messages broadcast by auxiliary network interface 310 of master device 302 enabling clock or timer synchronization between master device 302 and media devices 306. Again, using auxiliary network interface 310 of master device 302 to transmit clock synchronization messages and second network interface 352 of media devices 306 to receive clock synchronization messages enable clock synchronization even while audio content is being distributed via the private network between local network interface 308 of master device and first network interfaces 350 of media devices 306.

In an alternative embodiment, upon receiving a voice instruction, a media device 306 may connect directly to an accessible access point 314 and transmit the voice instruction directly to the remote computer system. For example, upon detecting a voice signal at the microphone of a media device 306. The processor of the media device 306 may convert that voice signal into voice data representing the voice signal. The media device 306 can then use its second network interface 352 to transmit that voice data to a remote cloud computer system through access point 314 for processing. The media device 306 can receive a response message corresponding to the voice data through access point 314 at second network interface 352. In this manner, the media device 306 may avoid using the private network for voice data communications.

In such an arrangement, the media device 306 may continue being connected to the private network with master device 302 while communicating with the remote computer system directly through access point 314 using separate network interfaces. Alternatively, the media device 306 may disconnect from the private network while the voice communication is being transmitted and processed and the response is being received. After the response is received, the media device 306 may reconnect to the private network to reestablish communication with master device 302.

During an audio distribution activity, the audio content is split into a number of frames, where the frames each have a frame length. For example, in the case of DOLBY audio, the frame are of length 32 ms. Audio source 304 transmits the frames to master device 302 in the form of one or more data packets. The data packets are transmitted so that master device 302 receives a new frame of audio data at time intervals equal to the frame length. For example, in the case of DOLBY audio, a new frame is received by master device 302 from audio source 304 every 32 ms (e.g., at 0 ms, 32 ms, 64 ms, etc.). The data packets containing each audio content frame may take less time to transmit than the duration of the frame when the audio content is played. For example, the data packets containing one frame of audio content that may contain audio content having a duration of 32 ms may only take from about 100 microseconds or less to about 2 ms to transmit to master device 302.

When transmitting audio content to media devices 306, master device 302 retransmits the audio content frames in one or more packets to media devices 306 using the private network, as described above. Upon receipt, the media devices 306, at the appropriate time, process the received audio content frames to generate output audio. The time required for media devices 306 to process the received audio content frame to generate the audio output is referred to as a placement delay or $T_{place}$.

For a particular audio content stream received from audio source 304, master device 302 determines a frame transmission delay budget $T_d$. $T_d$ describes the maximum amount of time master device 302 can take from receiving an audio frame from audio source 304 to delivering the audio frame to a media device 306 for processing without there being an unacceptable delay in the audio output from the media device 306. The higher the value of $T_d$, the more time master device 302 has to distribute audio content to the media devices 306.

Typically, when the audio content is associated with visual content being outputted by a display device, the value $T_d$ will be at least partially determined by any delay that has been introduced to the video playback. For live television (e.g., where the video and audio content is received by the television over an antenna or cable connection), the audio source 304 is the television and the television does not delay the video output. In that case, the value Td is set to a maximum value to enable as much delay as possible that still allows the audio content to be distributed to the media devices 306 and output in a manner that does not result in a noticeable delay.

As described above, a typical user will not notice a delay between video display and audio output that is less than a noticeable delay value of approximately 100 ms (other approaches may specify different values for a noticeable delay). Accordingly, where the audio content is associated with video content that is being output with no delay, Td is set to a value so that $T_d$ (the delay require to distribute the audio content to each media device 306) plus $T_{place}$ (the delay required for the media devices 306 to process the audio content) is equal to or less than the noticeable delay value of 100 ms. Accordingly, where there is no video delay, $T_d$ may be set to a value of approximately 30 ms, where $T_{place}$ is approximately 70 ms.

If, however, the audio content received by master device 302 from audio source 304 is associated with video content that has been delayed by a time period of video$_{delay}$, the value of $T_d$ can be increased because of the additional time delay afforded by the delayed video output. Typically, if the video output is delayed by a time period video$_{delay}$, $T_d$ can be set to a value equal to the value of $T_d$ if no video delay were present plus video$_{delay}$.

Higher values of $T_d$ can allow for more robust distribution of audio content, as the additional delay allows more time for the audio content frames to be distributed to each of media devices 306 and may allow for several retransmissions of the audio content frames should an initial transmission of a frame of audio content be unsuccessful. Lower values of $T_d$ do not allow for as many retransmission and may result in more dropped frames of audio content.

If the value of $T_d$ is less than the duration of one frame of audio content, the audio content frames are distributed to each of media devices 306 and processed without buffering. Conversely, and as described herein, if the value of $T_d$ is greater than the duration of one frame of audio content, the audio content is distributed to each of media devices 306 and processed using buffering, where the buffer is configured to store $T_d$ divided by the frame length duration of audio content.

Having determined the value of $T_d$ for a particular audio source 304, master device 302 communicates the value $T_d$ to each media device 306 that will receive the audio content. The value of $T_d$, as described below, lets the media devices 306 determine when they should begin processing the audio content received from master device 302. Additionally, because $T_d$ takes into account any video delays that may be in place, the media devices 306 use the value $T_d$ to provide their audio outputs are synchronized with the delayed video output.

To illustrate, Table 1, below, shows example time sequences for the processing of a number of frames in an example audio content stream that may be received by master device 302 from audio source 304. In the example data stream, the frame lengths are 32 ms.

TABLE 1

| Frame Number | Frame Arrives at Master Device | Maximum Time for Frame to Arrive at Media Device | Media Device Outputs Audio for Frame |
|---|---|---|---|
| F0 | T = 0 ms | T = $T_d$ | T = $T_d$ + $T_{place}$ |
| F1 | T = 32 ms | T = 32 ms + $T_d$ | T = 32 ms + $T_d$ + $T_{place}$ |
| F2 | T = 64 ms | T = 64 ms + $T_d$ | T = 64 ms + $T_d$ + $T_{place}$ |
| F3 | T = 96 ms | T = 96 ms + $T_d$ | T = 96 ms + $T_d$ + $T_{place}$ |

Referring to Table 1, master device 302 receives a first frame F0 from audio source 304 at time T=0 ms (see second column). Having received frame F0, master device 302 retransmits the frame to media device 306. As seen in the third column, the frame must arrive at the media device 306 no later than T=$T_d$, the maximum delay allowable for transmission of the frame to the media device 306. Upon receipt of the frame, the media device 306 processes the received frame data (requiring a time period $T_{place}$). The corresponding audio is ready to be output by the media device 306 at the time T=$T_d$+$T_{place}$ (see the fourth column).

In the second row of Table 1, master device 302 receives a second frame F1 from audio source 304 at time T=32 ms (see second column). Having received frame F1, master device 302 retransmits the frame to media device 306. As seen in the third column, the frame must arrive at the media device 306 no later than T=32 ms+$T_d$. Upon receipt of the frame, the media device 306 processes the received frame data (requiring a time period $T_{place}$). The corresponding audio is ready to be output by the media device 306 at the time period T=32 ms+$T_d$+$T_{place}$ (see the fourth column).

In the third row of Table I, master device 302 receives a third frame F2 from audio source 304 at time T=64 ms (see second column). Having received frame F2, master device 302 retransmits the frame to media device 306. As seen in the third column, the frame must arrive at the media device 306 no later than T=64 ms+$T_d$. Upon receipt of the frame, the media device 306 processes the received frame data (requiring a time period $T_{place}$). The corresponding audio is ready to be output by the media device 306 at the time period T=64 ms+$T_d$+$T_{place}$ (see the fourth column).

Finally, in the fourth row of Table 1, master device 302 receives a fourth frame F3 from audio source 304 at time T=96 ms (see second column). Having received frame F3, master device 302 retransmits the frame to media device 306. As seen in the third column, the frame must arrive at the media device 306 no later than T=96 ms+$T_d$. Upon receipt of the frame, the media device 306 processes the received frame data (requiring a time period $T_{place}$). The corresponding audio is ready to be output by the media device 306 at the time period $T=96$ ms+$T_d$+$T_{place}$ (see the fourth column).

In this manner, master device 302 continues receiving frames of audio content from audio source 304 and redistributes the frames of audio content to media device 306 for output. The frames of audio content are distributed wireless in accordance with the delay constraints established by the value $T_d$ and the media devices 306 use the value $T_d$ to synchronize their audio output.

As seen in Table 1, both master device 302 and the media devices 306 process the received frames of audio content using the current time value T. In order to provide synchronized processing of the audio content, master device 302 and media devices 306 utilized time synchronization to ensure that each device has a synchronized timer with which to accurately measure the current time T. The current time T may be measured as an absolute time, or may be measured as a duration of time that has expired since a particular audio content distribution was initiated. In an embodiment, time synchronization may be performed between master device 302 and media devices 306 at a regular interval (e.g., every minute) using existing protocols to establish time synchronization with accuracies up to or exceeding 150 microseconds.

Figure 4:
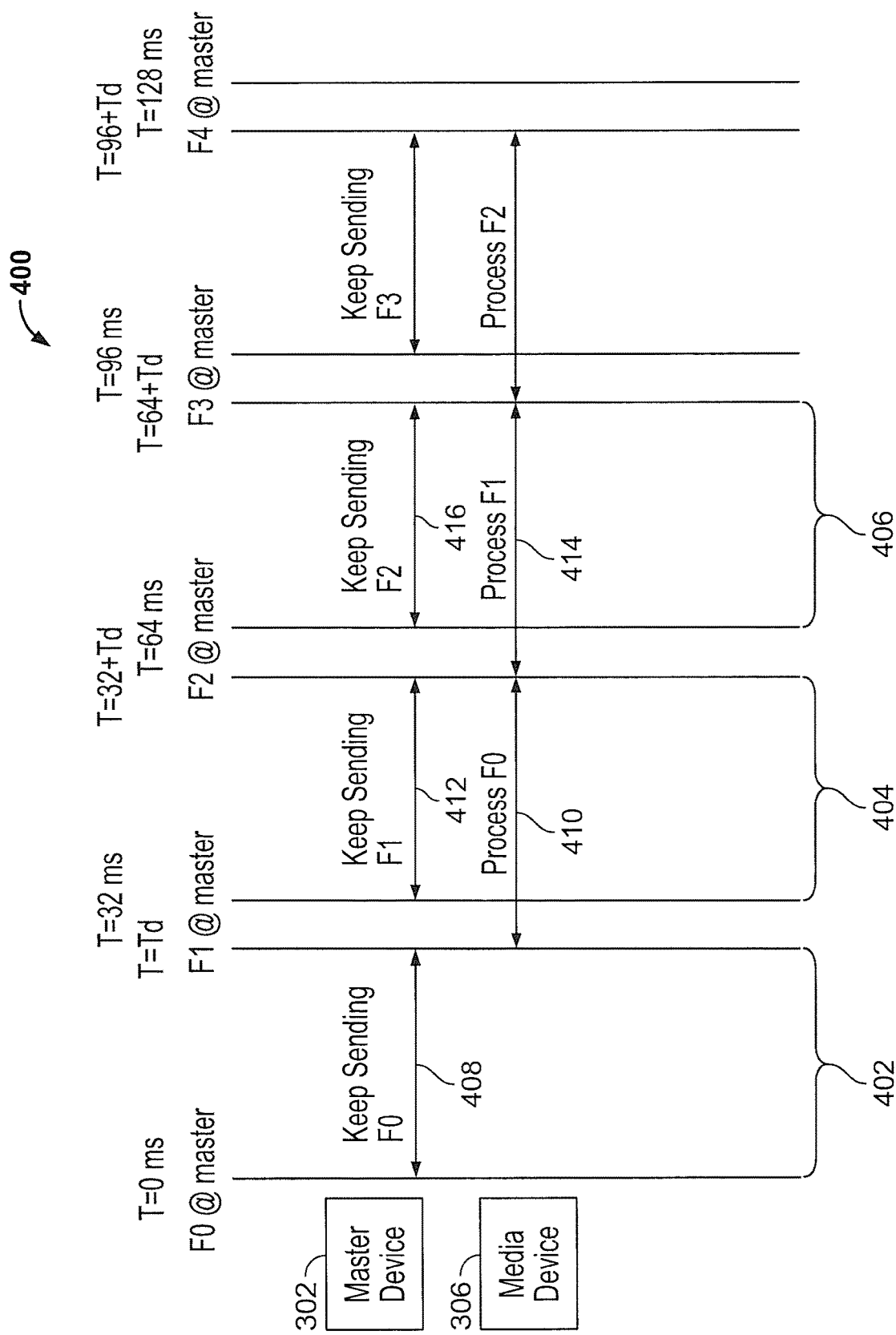
FIG. 4 is a timing diagram depicting a sequence of message transmissions executed by a media distribution device to distribute audio content to a media device.

To illustrate the algorithm used by master device 302 to transmit audio content to media devices 306, FIG. 4 is a timing diagram 400 depicting a sequence of message transmissions executed by master device 302 to distribute audio content to media device 306. In FIG. 4, the sequence illustrates the transmission of audio content to a single media device 306, though it should be understand that similar message sequencing would apply to the distribution of audio content to additional media devices 306. In FIG. 4, the leftmost side of the diagram represents the state of master device 302 and media device 306 at a time $T=0$. Moving to the right in the diagram time T increases and messages transmitted by master device 302 and processed by media device 306 are depicted in that timeline. The example shown in FIG. 4 presumes an audio content stream including frames that include audio content having a duration of 32 ms. It should be understood that a similar message sequence may be utilized for audio content streams having frames of different durations.

In the example of FIG. 4, the value $T_d$ is set to a duration less than the frame length of 32 ms. In an embodiment, $T_d$ may be determined by master device 302 first determining that audio source 304 is not implementing a delay for video playback (e.g., master device 302 may receive an indication from audio source 304 that there is no video delay). With no video delay being implemented, the value of $T_d$ may be set to an appropriate value to ensure that the audio content is delivered to the media devices and corresponding audio output generated without a noticeable or minimal delay. In an embodiment, $T_d$ is set to a value equal to a maximum delay that is not noticeable to a user (e.g., 100 ms) minus $T_{place}$, the time required for a media device to process a received frame. In other embodiments, $T_d$ may be set to a value equal to a maximum ping latency of the media devices 306 to which the master device 302 is transmitting content.

In this example, the value $T_d$ is set to a duration less than the frame length of 32 ms, and, as such, the message sequencing of FIG. 4 may be applicable to circumstances in which the audio content being distributed is associated with video content for which there is no delay.

Referring to FIG. 4, at time $T=0$, master device 302 receives the contents of a first frame F0 from audio source 304. As described above, both master device 302 and media device 306 execute coordinated timers to measure time T for purposes of synchronizing the processing of audio content frames. Frame F0 is associated with a start time of $T=0$ ms. Upon receiving frame F0, during time period 402, master device 302 transmits frame F0 (in the form of one or more data packets) in step 408 to media device 306 (as well as any other media devices configured to receive the audio content). Master device 302 may transmit frame F0 in step 408 using the private network. The frames may be transmitted to each media device 306 using real-time transport protocol (RTP) multicasting. As described above, although the duration of the audio content contained within frame F0 has a duration of 32 ms, it requires less time to transmit frame F0 to media device 306. Accordingly, during time period 402 and in step 408, master device 302 may transmit frame F0 multiple times to media device 306. In typical application, frame F0 may be retransmitted from three to five times by master device 302 As such, if media device 306 does not successfully receive the first transmission of the contents of frame F0 from master device 302, media device 306 may receive one of the subsequent transmissions.

At time $T=T_d$, the time at which media device 306 should begin playing frame F0, master device 302 stops transmitting frame F0. This is because, now that $T_d$ has expired for frame F0, even if master device 302 were to successfully deliver frame F0 to media device 302, the media device 302 could not begin playing the audio content in a time period less than or equal to the start time of frame F0 (0 ms) plus $T_d$, which may result in noticeable delay or lack of synchrony of the audio output of media device 306.

In an embodiment, master device 302 may be configured to control the timing of delivery of frames of audio data at the media access control (MAC) level of the network stack of master device 302. In that case, the MAC level of the master device may be configured to determine access times for transmitting a single copy of frame F0 using the private network. Based upon those access times, the MAC level of the master device 302 can determine a number of transmission retries of frame F0 so that the last retry ends at the desired time (i.e., time $T=T_d$). In this approach, controlling retransmissions at the MAC level rather than at the application level within master device 302, more accurate control of the timing of retransmissions of frame F0 (and the cessation of transmissions of frame F0) may be achieved. The same approach may be utilized for meeting the timing requirements of transmissions of other frames.

At time $T=0$ ms+$T_d$ (e.g., the start time of frame F0 plus the delay TO, media device 306 processes frame F0 in step 410 and generates a corresponding audio output. The duration of the frame is 32 ms, and, as such, the audio output of frame F0 will last until time $T=32$ ms+$T_d$.

At time $T=32$ ms, master device 302 receives the contents of a second frame F1 from audio source 304. Being the second received frame, frame F1, in this example, is associated with a start time of 32 ms. Upon receiving frame F1, during time period 404, master device 302 transmits frame F1 (in the form of one or more data packets) to media device 306 (as well as any other media devices configured to receive the audio content) in step 412. Master device 302 may transmit frame F1 in step 412 using the private network using RTP multicasting. Although the duration of the audio content contained within frame F1 has a duration of 32 ms, it requires less time to transmit frame F1 to media device 306. Accordingly, during time period 404, master device 302 may transmit frame F1 multiple times to media device 306. At time T=32 ms+$T_d$, the time at which media device 306 should begin playing frame F1, master device 302 stops transmitting frame F1.

At time T=32 ms+$T_d$ (e.g., the start time of frame F1 plus the delay TO, media device 306 processes frame F1 in step 414 and generates a corresponding audio output. The duration of the frame is 32 ms, and, as such, the audio output of frame F1 will last until time T=64 ms+$T_d$.

At time T=64 ms, master device 302 receives the contents of a third frame F2 from audio source 304. Frame F2 is associated with a start time of 64 ms. Upon receiving frame F2, during time period 406, master device 302 transmits frame F2 (in the form of one or more data packets) to media device 306 (as well as any other media devices configured to receive the audio content) in step 416. Master device 302 may transmit frame F2 using the private network using RTP multicasting. Although the duration of the audio content contained within frame F2 has a duration of 32 ms, it requires less time to transmit frame F2 to media device 306. Accordingly, during time period 406, master device 302 may transmit frame F2 multiple times to media device 306. At time T=64 ms+$T_d$, the time at which media device 306 should begin playing frame F2, master device 302 stops transmitting frame F2.

At time T=64 ms+Td (e.g., the start time of frame F2 plus the delay TO, media device 306 processes frame F2 and generates a corresponding audio output. The duration of the frame is 32 ms, and, as such, the audio output of frame F2 will last until time T=96 ms+$T_d$.

Additional frames F3, F4, etc. of the audio content are transmitted to media device 306 in the same manner using the same sequence of transmission and processing steps.

In the messaging sequence depicted in FIG. 4, it is presumed that media device 306 successfully receives each frame during the time period (e.g., time periods 402, 404, and 406) in which master device 302 is transmitting the frame. If, however, media device 306 does not successfully received a particular frame, media device 306 may not generate an audio output for the time period allocated for that frame. Accordingly, in embodiments, master device 306 may be configured to transmit frames to media devices 306 for an additional duration enabling a media device 306 to begin outputting audio based on a frame, even if the media device 306 only receives the frame after the time period corresponding to the beginning of the frame has passed. In such a case, media device 306 may only generate an audio output based on a portion of the frame. In short, the media device 306 outputs audio when the frame becomes available, minimizing the time period during which the media device 306 is not generating any output audio.

Figure 5:
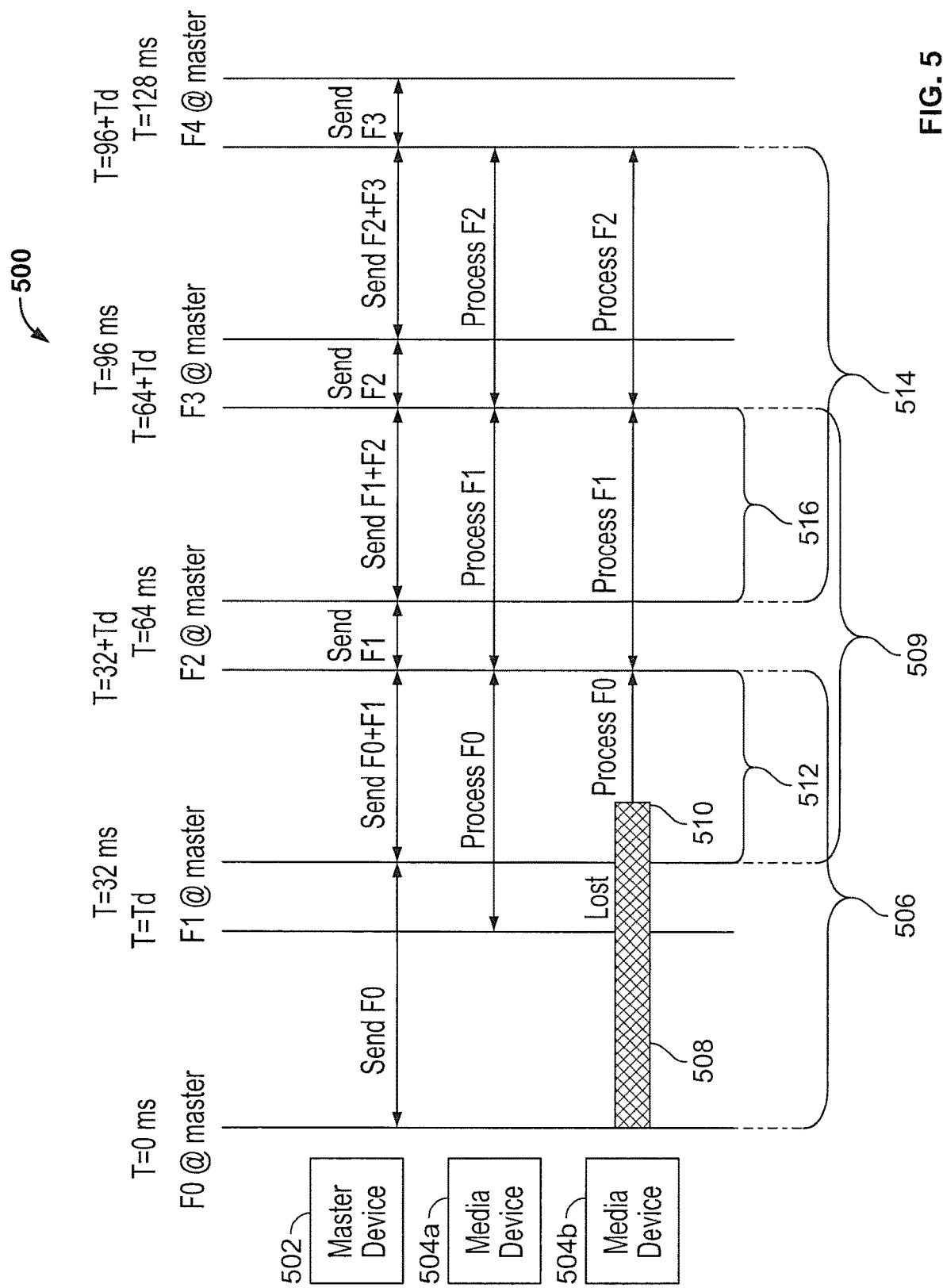
FIG. 5 is a timing diagram depicting a sequence of message transmissions executed by a media distribution device to distribute audio content to a number of media devices.

FIG. 5 is a timing diagram 500 depicting a sequence of message transmissions executed by master device 502 (e.g., master device 302) to distribute audio content to media devices 504a and 504b (e.g., media devices 306). In FIG. 5, the sequence illustrates the transmission of audio content to two media devices 504, though it should be understand that similar message sequencing would apply to the distribution of audio content to additional media devices. In FIG. 5, the leftmost side of the diagram represents the state of master device 502 and media devices 504a and 504b at a time T=0. Moving to the right in the diagram time T increases. The example shown in FIG. 5 presumes an audio content stream including frames that include audio content having a duration of 32 ms. Each frame is associated with a start time and the master device 502 and media devices 504a and 504b each implement synchronized timers to coordinates the processing of received frames. It should be understood that a similar message sequence may be utilized for audio content streams having frames of different durations.

In the example of FIG. 5, the value $T_d$ is set to a duration less than the frame length of 32 ms. In an embodiment, $T_d$ may be determined by master device 502 first determining that the audio source of the audio content is not implementing a delay for video playback (e.g., master device 502 may have received an indication from an audio source that the audio content is being provided with no corresponding video delay). With no video delay being implemented, the value of $T_d$ may be set to an appropriate value to ensure that the audio content is delivered to the media devices 504a and 504b and corresponding audio output generated without a noticeable delay. In an embodiment, $T_d$ is set to a value equal to a maximum delay that is not noticeable to a user (e.g., 100 ms) minus $T_{place}$, the time required for media devices 504a and 504b to process a received frame. In other embodiments, $T_d$ may be set to a value equal to a maximum ping latency of the media devices to which the master device is transmitting content (in this example, media devices 504a and 504b).

Because, in this example, the value $T_d$ is set to a duration less than the frame length of 32 ms, the message sequencing of FIG. 5 may be applicable to circumstances in which the audio content being distributed is associated with video content for which there is no delay.

Referring to FIG. 5, at time T=0, master device 502 receives the contents of a first frame F0 from an audio source. Frame F0 is associated with a start time of 0 ms. Upon receiving frame F0, during time period 506, master device 502 transmits frame F0 (in the form of one or more data packets) to media devices 504a and 504b (as well as any other media devices configured to receive the audio content) in step 520. Master device 502 may transmit frame F0 using the private network. The frames may be transmitted to each media device 504a and 504b using RTP multicasting. As described above, although the duration of the audio content contained within frame F0 has a duration of 32 ms, it requires less time to transmit frame F0 to media devices 504a and 504b in step 520. Accordingly, during time period 506, master device 502 may transmit frame F0 multiple times (e.g., from three to five times) to media devices 504a and 504b. As such, if either of media devices 504a and 504b do not successfully receive the first transmission of the contents of frame F0 from master device 502, media devices 504a and 504b may receive one of the subsequent transmissions.

Master device 502 continues transmitting frame F0 until time T=32 ms+$T_d$. Because the length of the content of frame F0 is 32 ms, the time T=32 ms+$T_d$ represents the latest time that any portion of the frame F0 can be received and processed by a media device 504a and 504b (that is, the time at which the output of frame F0 by either of media devices 504a and 504b should end) to generate some audio content for the frame, even if only a portion of the frame is processed.

In an embodiment, master device 502 may be configured to control the timing of delivery of frames of audio data at the MAC level of the network stack of master device 502. In that case, the MAC level of the master device may be configured to determine access times for transmitting a single copy of frame F0 using the private network. Based upon those access times, the MAC level of the master device 502 can determine a number of transmission retries of frame F0 so that the last retry ends at the desired time (i.e., time T=32 ms+$T_d$). In this approach, controlling retransmissions at the MAC level rather than at the application level within master device 502, more accurate control of the timing of retransmissions of frame F0 (and the cessation of transmissions of frame F0 may be achieved). The same approach may be utilized for meeting the timing requirements of transmissions of other frames.

In the example messaging sequence of FIG. 5, media device 504b does not successfully receive the frame F0 before time T=0 ms+$T_d$ (the time at which the frame, if successfully received, would be processed by media device 504b) due to a number of failed transmissions of frame F0 indicated by block 508. Had media device 504b successfully received frame F0 before time T=$T_d$, media device 504b would have initiated processing of frame F0 and output of corresponding audio at time T=0 ms+$T_d$ (i.e., the start time associated with frame F0 plus the delay $T_d$). But in this configuration, after successfully receiving frame F0 at point 510, media device 504b begins processing frame F0 and outputting corresponding audio. Specifically, media device 504b decodes the received frame into a number of sequential segments or samples (e.g., pulse-code modulation (PCM) samples), where the samples have a known sample rate. Using the sample rate, media device 504b determines the duration of the samples. With the duration known, media device 504b can determine the start times associated with each individual sample within the received frame. Media device 504b then determines the current time T and begins playing the sample with a start time corresponding to the current time T plus the delay $T_d$.

During the time period from $T_d$ to time period 510 during which media device 504b should have been outputting the content of frame F0, but was unable to because frame F0 had not been successfully received from master device 502, media device 504b may simply output no audio content (i.e., silence). In some embodiments, however, because periods of silence (even of short duration) may be noticeable to the user, media device 504b (and in fact, all media devices 306) may be configured to implement packet loss concealment techniques to generate output audio waveforms arranged to camouflage the lack of audio content. Such waveforms may be generated using waveform substitution with smoothing according to known techniques. The waveforms can then be used to generate audible output to mask or camouflage periods of time during which media device 504b cannot generate audio output due to missing frame data. Generally, if a particular media device 504a or 504b determines that it has not received a particular frame by the time the frame should have started processing (i.e., the start time associated the frame plus the delay $T_d$), the media device may output silence or implement packet loss concealment until such time that the media device receives the frame.

At time T=32 ms+$T_d$ (i.e., the time at which the audio output associated with frame F0 should cease), master device 502 stops transmitting frame F0. This is because at time T=32 ms+$T_d$, media devices 504a and 504b should no longer be processing frame F0 and should have begun processing and outputting audio based upon frame F1.

At time T=32 ms, master device 502 receives the contents of a second frame F1 from the audio source. Frame F1 is associated with a start time of 32 ms. Upon receiving frame F1, during time period 509, master device 502 transmits frame F1 (in the form of one or more data packets) to media devices 504a and 504b (as well as any other media devices configured to receive the audio content). Master device 502 may transmit frame F1 using the private network using RTP multicasting. Although the duration of the audio content contained within frame F1 has a duration of 32 ms, it requires less time to transmit frame F1 to media devices 504a and 504b. Accordingly, during time period 509, master device 502 may transmit frame F1 multiple times to media devices 504a and 504b.

Master device 502 continues transmitting frame F1 until time T=64 ms+$T_d$. Because the length of the content of frame F1 is 32 ms, the time T=64 ms+$T_d$ represents the latest time that any portion of the frame F1 can be received and processed by a media device 504a and 504b to generate some audio content for the frame, even if only a portion of the frame is processed. As such, if one of media devices 504a and 504b does not successfully receive the frame F1 before time T=32 ms+$T_d$ (the time at which the frame, if successfully received, would be processed by the media device 504a or 504b) due to a number of failed transmissions of frame F1, the media device 504a or 504b may begin processing frame F1 at the time it is successfully received. At time T=64 ms+$T_d$, master device 502 stops transmitting frame F1. This is because at time T=64 ms+$T_d$, media devices 504a and 504b should no longer be processing frame F1 and should have begun processing frame F2.

As illustrated in FIG. 5, there is a time period 512 during which master device 502 is transmitting both frame F0 and F1. During time period 512, master device 502 may combine the contents of both frame F0 and F1 into a single packet that is transmitted to media devices 504a and 504b. Specifically, master device 502, upon receiving the contents of frame F1 may determines the current time T is less than 32 ms+Ta (the time at which the master device 502 stops transmitting F0). As such, master device 502 may determine that it is transmitting both frames F0 and F1 and may combine both of those frames into a single data packet for transmissions to media devices 504a and 504b.

Media devices 504a and 504b begin processing frame F1 at time T=32 ms+Ta (i.e., the start time associated with frame F1 plus the delay $T_d$) or at the time frame F1 is available, is only received after time T=32 ms+$T_d$.

At time T=64 ms, master device 502 receives the contents of a third frame F2 from the audio source. Frame F2 is associated with a start time of 64 ms. Upon receiving frame F2, during time period 514, master device 502 transmits frame F2 (in the form of one or more data packets) to media devices 504a and 504b (as well as any other media devices configured to receive the audio content). Master device 502 may transmit frame F2 using the private network using RTP multicasting. Although the duration of the audio content contained within frame F2 has a duration of 32 ms, it requires less time to transmit frame F2 to media devices 504a and 504b. Accordingly, during time period 514, master device 502 may transmit frame F2 multiple times to media devices 504a and 504b.

Master device 502 continues transmitting frame F2 until time T=96 ms+$T_d$. Because the length of the content of frame F2 is 32 ms, the time T=96 ms+$T_d$ represents the latest time that any portion of the frame F2 can be received and processed by a media device 504a and 504b to generate some audio content for the frame, even if only a portion of the frame is processed. As such, if one of media devices 504a and 504b does not successfully receive the frame F2 before time T=64 ms+$T_d$ (the time at which the frame, if successfully received, would be processed by the media device 504a or 504b) due to a number of failed transmissions of frame F2, the media device 504a or 504b may begin processing frame F2 at the time it is successfully received. At time T=96 ms+$T_d$, master device 502 stops transmitting frame F2. This is because at time T=96 ms+$T_d$, media devices 504a and 504b should no longer be processing frame F2 and should have begun processing frame F3.

As illustrated in FIG. 5, there is a time period 516 during which master device 502 is transmitting both frame F1 and F2. During time period 516, master device 502 may combine the contents of both frame F1 and F2 into a single packet that is transmitted to media devices 504a and 504b. Specifically, master device 502, upon receiving the contents of frame F2 may determines the current time T is less than 64 ms+$T_d$ (the time at which the master device 502 stops transmitting F1). As such, master device 502 may determine that it is transmitting both frames F1 and F2 and may combine both of those frames into a single data packet for transmissions to media devices 504a and 504b.

Additional frames F3, F4, etc. of the audio content are transmitted to media device 306 in the same manner using the same sequence of transmission and processing steps.

Both of the messaging protocols illustrated in FIGS. 4 and 5 depict transmission schemes in which $T_d$ is less than a frame duration. This may be a condition that typically occurs when the audio content being distributed is associated with a video output, wherein the video output is not delayed. In other situations, however, video content may be delayed (e.g., by a streaming media player or other device that is processing the video and audio content) to delay the output of the video by some period of time. This delay allows for more time for the distribution and processing of the audio content to a number of remote media devices.

For example, a media source (e.g., a streaming media player) may implement a video by staggering its output of video content and audio content. Specifically, a multimedia source may process a multimedia data stream to generate a sequence of audio content frames and a sequence of video content frames. The audio content frames and video content frames are synchronized so that a start time of a first audio content frame is equal to a start time of a first video content frame. To generate a video delay, the multimedia source may delay the output of video content frames (e.g., to a television), while not delaying the output of the audio content frames (e.g., to a master device). For example, the first audio content frame may be output by the multimedia source at a first time and the first video content frame may be output later at a second time. The difference between the first time and the second time is the video delay.

Figure 6:
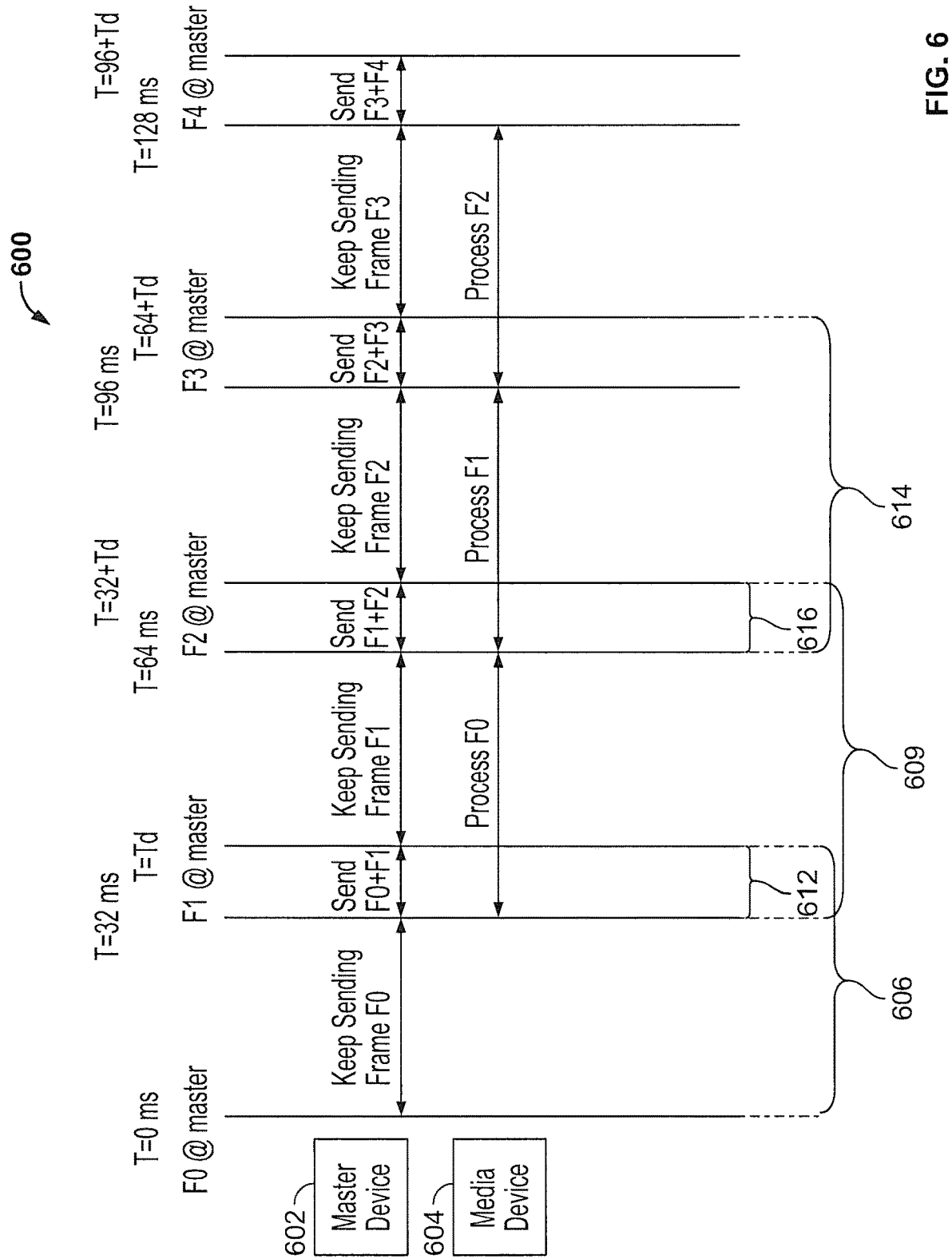
FIG. 6 is a timing diagram depicting a sequence of message transmissions executed by a media distribution device to distribute audio content to a media device using buffering.

FIG. 6 is a timing diagram 600 depicting a sequence of message transmissions executed by master device 602 (e.g., master device 302) to distribute audio content to media device 604 (e.g., media device 306). In FIG. 6, the sequence illustrates the transmission of audio content to a single media devices 604, though it should be understand that similar message sequencing would apply to the distribution of audio content to additional media devices. In FIG. 6, the leftmost side of the diagram represents the state of master device 602 and media device 604 at a time T=0. Moving to the right in the diagram time T increases. The example shown in FIG. 6 presumes an audio content stream including frames that include audio content having a duration of 32 ms. It should be understood that a similar message sequence may be utilized for audio content streams having frames of different durations.

In the example of FIG. 6, the value $T_d$ is set to a duration greater than the frame length of 32 ms. In an embodiment, $T_d$ may be determined by master device 602 based upon a notification provided by the audio source or multimedia source that the audio content is associated with video content and that the video content output has been delayed by a time duration. The value $T_d$ may then be set based upon the delay of the video content output. For example, if the video content is delayed by a duration equal to video$_{delay}$, $T_d$ may be set to a duration equal to video$_{delay}$-$T_{place}$.

Referring to FIG. 6, at time T=0, master device 602 receives the contents of a first frame F0 from an audio source. Frame F0 is associated with a start time of 0 ms. Upon receiving frame F0, during time period 606, master device 602 transmits frame F0 (in the form of one or more data packets) to media device 604 (as well as any other media devices configured to receive the audio content). Master device 602 may transmit frame F0 using the private network. The frames may be transmitted to media device 604 using real-time transport protocol (RTP) multicasting. As described above, although the duration of the audio content contained within frame F0 has a duration of 32 ms, it requires less time to transmit frame F0 to media device 604. Accordingly, during time period 606, master device 602 may transmit frame F0 multiple times (e.g., three to five times) to media device 604. As such, if media device 604 does not successfully receive the first transmission of the contents of frame F0 from master device 602, media device 604 may receive one of the subsequent transmissions.

Upon successful receipt of frame F0, media device 604 stores frame F0 in a suitable buffer until the frame contents are ready to be processed. Media device 604 may also be configured to transmit an acknowledgement of the packet or packets containing frame F0 to master device 602. Such an acknowledgement informs master device 602 that media device 604 has successfully received frame F0 and may stop transmitting frame F0 to media device 604. The acknowledgement may be transmitted to master device 602 through the private network or through an alternate communication channel, such as BLE interface 310 depicted in FIG. 3.

Master device 602 continues transmitting frame F0 until time T=$T_d$ (unless the transmission is ended early due to receipt of an acknowledgement from media device 604). At time T=$T_d$ (i.e., the time frame F0 should be processed by media device 604—T=0 ms plus the delay $T_d$), media device 604 processes the contents of frame F0 and begins generating an audio output. Because the value of $T_d$ was based on the amount of delay imposed on the corresponding video output, the audio output of media device 604 will be synchronized to the video output.

In an embodiment, master device 602 may be configured to control the timing of delivery of frames of audio data at the MAC level of the network stack of master device 602. In that case, the MAC level of the master device may be configured to determine access times for transmitting a single copy of frame F0 using the private network. Based upon those access times, the MAC level of the master device 602 can determine a number of transmission retries of frame F0 so that the last retry ends at the desired time (i.e., time T=$T_d$). In this approach, controlling retransmissions at the MAC level rather than at the application level within master device 602, more accurate control of the timing of retransmissions of frame F0 (and the cessation of transmissions of frame F0 may be achieved). The same approach may be utilized for meeting the timing requirements of transmissions of other frames.

At time T=32 ms, master device 602 receives the contents of a second frame F1 from the audio source. Frame F1 has an associated start time of 32 ms. Upon receiving frame F1, during time period 609, master device 602 transmits frame F1 (in the form of one or more data packets) to media device 604 (as well as any other media devices configured to receive the audio content). Master device 602 may transmit frame F1 using the private network using RTP multicasting. Although the duration of the audio content contained within frame F1 has a duration of 32 ms, it requires less time to transmit frame F1 to media device 604. Accordingly, during time period 609, master device 602 may transmit frame F1 multiple times to media device 604.

Upon successful receipt of frame F1, media device 604 stores frame F1 in a suitable buffer until the frame contents are ready to be processed. Media device 604 may also be configured to transmit an acknowledgement of the packet or packets containing frame F1 to master device 602. Such an acknowledgement informs master device 602 that media device 604 has successfully received frame F0 and may stop transmitting frame F0 to media device 604. The acknowledgement may be transmitted to master device 602 through the private network or through an alternate communication channel, such as BLE interface 310 depicted in FIG. 3. Media device 604 processes frame F1 at time T=32 ms (the start time of frame F1) plus the delay $T_d$.

Master device 602 continues transmitting frame F1 until time T=32 ms+$T_d$ (unless the transmission is ended early due to receipt of an acknowledgement from media device 604). At time T=32 ms+$T_d$, media device 604 processes the contents of frame F1 and begins generating an audio output. Because the value of $T_d$ was based on the amount of delay imposed on the corresponding video output, the audio output of media device 604 will be synchronized to the video output.

As illustrated in FIG. 6, there is a time period 612 during which master device 602 is transmitting both frame F0 and F1. During time period 612, master device 602 may combine the contents of both frame F0 and F1 into a single packet that is transmitted to media device 604. Specifically, master device 602, upon receiving the contents of frame F1 may determines the current time T is less than 32 ms+$T_d$ (the time at which the master device 602 stops transmitting F0). As such, master device 602 may determine that it is transmitting both frames F0 and F1 and may combine both of those frames into a single data packet for transmissions to media device 604.

At time T=64 ms, master device 602 receives the contents of a third frame F2 from the audio source. Frame F2 is associated with a start time of 64 ms. Upon receiving frame F2, during time period 614, master device 602 transmits frame F2 (in the form of one or more data packets) to media device 604 (as well as any other media devices configured to receive the audio content). Master device 602 may transmit frame F2 using the private network using RTP multicasting. Although the duration of the audio content contained within frame F2 has a duration of 32 ms, it requires less time to transmit frame F2 to media device 604. Accordingly, during time period 614, master device 602 may transmit frame F2 multiple times to media device 604.

Upon successful receipt of frame F2, media device 604 stores frame F0 in a suitable buffer until the frame contents are ready to be processed. Media device 604 may also be configured to transmit an acknowledgement of the packet or packets containing frame F2 to master device 602. Such an acknowledgement informs master device 602 that media device 604 has successfully received frame F2 and may stop transmitting frame F2 to media device 604. The acknowledgement may be transmitted to master device 602 through the private network or through an alternate communication channel, such as BLE interface 310 depicted in FIG. 3.

Master device 602 continues transmitting frame F2 until time T=64 ms+$T_d$ (unless the transmission is ended early due to receipt of an acknowledgement from media device 604). At time T=64 ms+$T_d$, media device 604 processes the contents of frame F2 and begins generating an audio output (i.e., at the start time of frame F2 (64 ms) plus the delay $T_d$). Because the value of $T_d$ was based on the amount of delay imposed on the corresponding video output, the audio output of media device 604 will be synchronized to the video output.

As illustrated in FIG. 6, there is a time period 616 during which master device 602 is transmitting both frame F1 and F2. During time period 616, master device 602 may combine the contents of both frame F1 and F2 into a single packet that is transmitted to media device 604. Specifically, master device 602, upon receiving the contents of frame F2 may determine the current time T is less than 64 ms+$T_d$ (the time at which the master device 602 stops transmitting F1). As such, master device 602 may determine that it is transmitting both frames F1 and F2 and may combine both of those frames into a single data packet for transmissions to media device 604.

Additional frames F3, F4, etc. of the audio content are transmitted to media device 306 in the same manner using the same sequence of transmission and processing steps.

In an embodiment, a system includes a media distribution device. The media distribution device includes an audio input configured to receive audio data, a first network interface, and a first processor. The first processor is configured to execute instructions for configuring the first network interface to use a first communication network, and broadcasting, using the first communication network and a real-time transport protocol, the audio data. The system includes a voice-controlled media device including a second network interface, a third network interface, a microphone, a loudspeaker, and a second processor. The second processor is configured to execute instructions for causing, using the second network interface, the voice-controlled media device to join the first communication network, receiving, using the second network interface, a first portion of the audio data, and processing the first portion of the audio data to generate first audio output. The second process is configured to execute instructions for receiving speech input via the microphone, generating first data representing the speech input, transmitting, using the third network interface, the first data to a remote cloud service, and receiving, using the third network interface, a message from the remote cloud service corresponding to the first data.

In another embodiment, a system includes a media distribution device including a first network interface, a second network interface, and a first processor. The first processor is configured to execute instructions for configuring the first network interface to use a first communication network, and broadcasting, using the first communication network, audio data. The system includes a media device including a third network interface, a fourth network interface, and a second processor. The second processor is configured to execute instructions for causing, using the third network interface, the media device to join the first communication network, receiving, using the third network interface, a first portion of the audio data, processing the first portion of the audio data to generate first audio output, and transmitting, using the fourth network interface, a control signal to the second network interface of the media distribution device. The control signal is configured to cause the first processor to modify an attribute of the audio data or stop broadcasting the audio data.

In another embodiment, a device includes a first network interface, a second network interface, a microphone, a loudspeaker, and a processor. The processor is configured to execute instructions for causing, using the first network interface, the device to join a first communication network, receiving, using the first network interface, a first portion of audio data broadcasted by a media distribution device to the first communication network, processing the first portion of the audio data to generate first audio output, receiving speech input via the microphone, generating first data representing the speech input, and transmitting, using the second network interface, the first data to a remote cloud service.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
 a media distribution device, including:
  an audio input configured to receive audio data,
  a first network interface, and
  a first processor configured to execute instructions for:
   configuring the first network interface to use a first communication network, and
   broadcasting, using the first communication network and a real-time transport protocol, the audio data; and
 a voice-controlled media device, including:
  a second network interface,
  a third network interface,
  a microphone,
  a loudspeaker, and
  a second processor configured to execute instructions for:
   causing, using the second network interface, the voice-controlled media device to join the first communication network,
   receiving, using the second network interface, a first portion of the audio data from the media distribution device using the real-time transport protocol,
   processing the first portion of the audio data to generate first audio output,
   receiving speech input via the microphone,
   generating first data representing the speech input,
   transmitting, using the third network interface, the first data to the media distribution device, and
   receiving, using the third network interface, a message from a remote cloud service corresponding to the first data.

2. The system of claim 1, wherein the media distribution device includes a fourth network interface and wherein the first portion of the audio data includes a first audio frame and after receiving the first portion the second processor of the voice-controlled media device is configured to execute instructions for transmitting, using the third network interface, an acknowledgement of receipt of the first audio frame to the fourth network interface.

3. The system of claim 1, wherein the media distribution device includes a fourth network interface and wherein the second processor of the voice-controlled media device is configured to execute instructions for transmitting, using the third network interface, a control signal to the fourth network interface of the media distribution device, wherein the control signal is configured to cause the first processor to modify an attribute of the audio data or stop broadcasting the audio data.

4. The system of claim 1, wherein the second network interface includes a first wireless local area network (WLAN) radio controller configured to communicate using a first WLAN communication channel at a first time and the third network interface includes a second WLAN radio controller configured to communicate using a second WLAN communication channel at the first time.

5. The system of claim 1, wherein the media distribution device includes a fourth network interface and wherein transmitting the first data to the media distribution device further comprises transmitting, using the third network interface of the voice-controlled media device, the first data to the fourth network interface.

6. A system, comprising:
 a media distribution device, including:
  a first network interface,
  a second network interface, and
  a first processor configured to execute instructions for:
   configuring the first network interface to use a first communication network, and
   broadcasting, using the first communication network, audio data; and
 a media device, including:
  a third network interface,
  a fourth network interface, and a second processor configured to execute instructions for:
  causing, using the third network interface, the media device to join the first communication network,
  receiving, using the third network interface, a first portion of the audio data from the media distribution device,
  processing the first portion of the audio data to generate first audio output, and
  transmitting, using the fourth network interface, a control signal to the second network interface of the media distribution device, wherein the control signal is configured to cause the first processor to modify an attribute of the audio data or stop broadcasting the audio data.

7. The system of claim 6, wherein the first portion of the audio data includes a first audio frame and after receiving the first portion the second processor is configured to execute instructions for transmitting, using the fourth network interface, an acknowledgement of receipt of the first audio frame to the second network interface.

8. The system of claim 6, wherein the media device further comprises a microphone and the second processor is configured to execute instructions for:
  receiving speech input via the microphone;
  generating speech data using the speech input; and
  transmitting, using the fourth network interface, the speech data to a remote cloud service.

9. The system of claim 8, wherein transmitting the speech data to the remote cloud service further comprises transmitting, using the fourth network interface, the speech data to the second network interface.

10. The system of claim 9, wherein the media distribution device further comprises a fifth network interface and the first processor is configured to execute instructions for:
  transmitting, using the fifth network interface, the speech data to the remote cloud service;
  receiving, using the first network interface, a message from the remote cloud service corresponding to the speech data;
  generating second audio data using the message; and
  broadcasting, using the first communication network, the audio data.

11. The system of claim 9, wherein the media distribution device further comprises a fifth network interface and the first processor is configured to execute instructions for:
  transmitting, using the fifth network interface, the speech data to the remote cloud service;
  receiving, using the first network interface, a message from the remote cloud service corresponding to the speech data; and
  transmitting, using the second network interface, the message to the fourth network interface.

12. The system of claim 6, wherein the third network interface includes a first wireless local area network (WLAN) radio controller configured to communicate using a first WLAN communication channel at a first time and the fourth network interface includes a second WLAN radio controller configured to communicate using a second WLAN communication channel at the first time.

13. The system of claim 6, wherein the first processor is configured transmit, using the second network interface, a clock synchronization message, while broadcasting the audio data using the first communication network.

14. A device, comprising:
  a first network interface;
  a second network interface;
  a microphone;
  a loudspeaker; and
  a processor configured to execute instructions for:
    causing, using the first network interface, the device to join a first communication network,
    receiving, using the first network interface, a first portion of audio data broadcasted by a media distribution device to the first communication network,
    processing the first portion of the audio data to generate first audio output,
    receiving speech input via the microphone,
    generating first data representing the speech input, and
    transmitting, using the second network interface, the first data to the media distribution device.

15. The device of claim 14, wherein the processor is configured to execute instructions for transmitting, using the second network interface, a control signal to the media distribution device, wherein the control signal is configured to cause the media distribution device to modify an attribute of the audio data or stop broadcasting the audio data.

16. The device of claim 14, wherein the first portion of the audio data includes a first audio frame and after receiving the first portion the processor is configured to execute instructions for transmitting, using the second network interface, an acknowledgement of receipt of the first audio frame to the media distribution device.

17. The device of claim 14, wherein the first network interface includes a first wireless local area network (WLAN) radio controller configured to communicate using a first WLAN communication channel at a first time and the second network interface includes a second WLAN radio controller configured to communicate using a second WLAN communication channel at the first time.

18. The device of claim 14, wherein transmitting, using the second network interface, the first data includes transmitting the first data using a BLUETOOTH low energy communication protocol.

19. The device of claim 14, wherein the processor is configured to receive, using the second network interface, a clock synchronization message, while receiving, using the first network interface, the first portion of audio data.

* * * * *